Oct. 20, 1942.  V. FINSTON  2,299,618
AUTOMATIC CONVEYING AND ELEVATING MACHINE
Filed Aug. 24, 1940  7 Sheets-Sheet 1

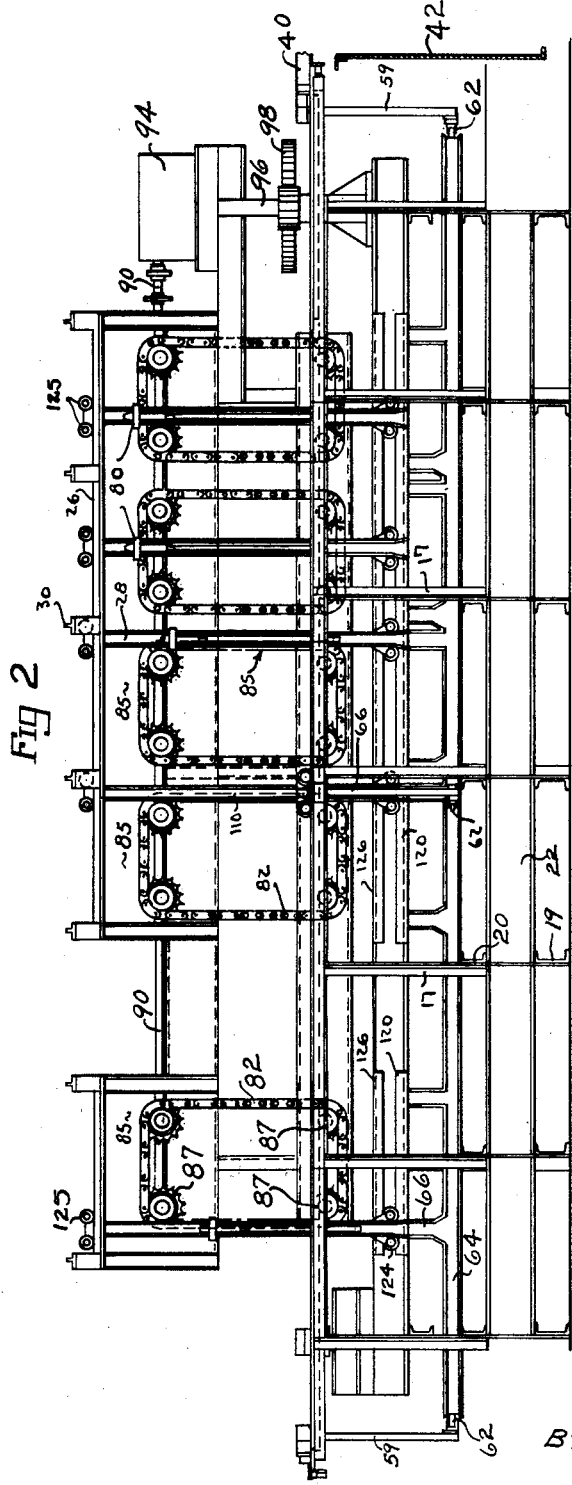

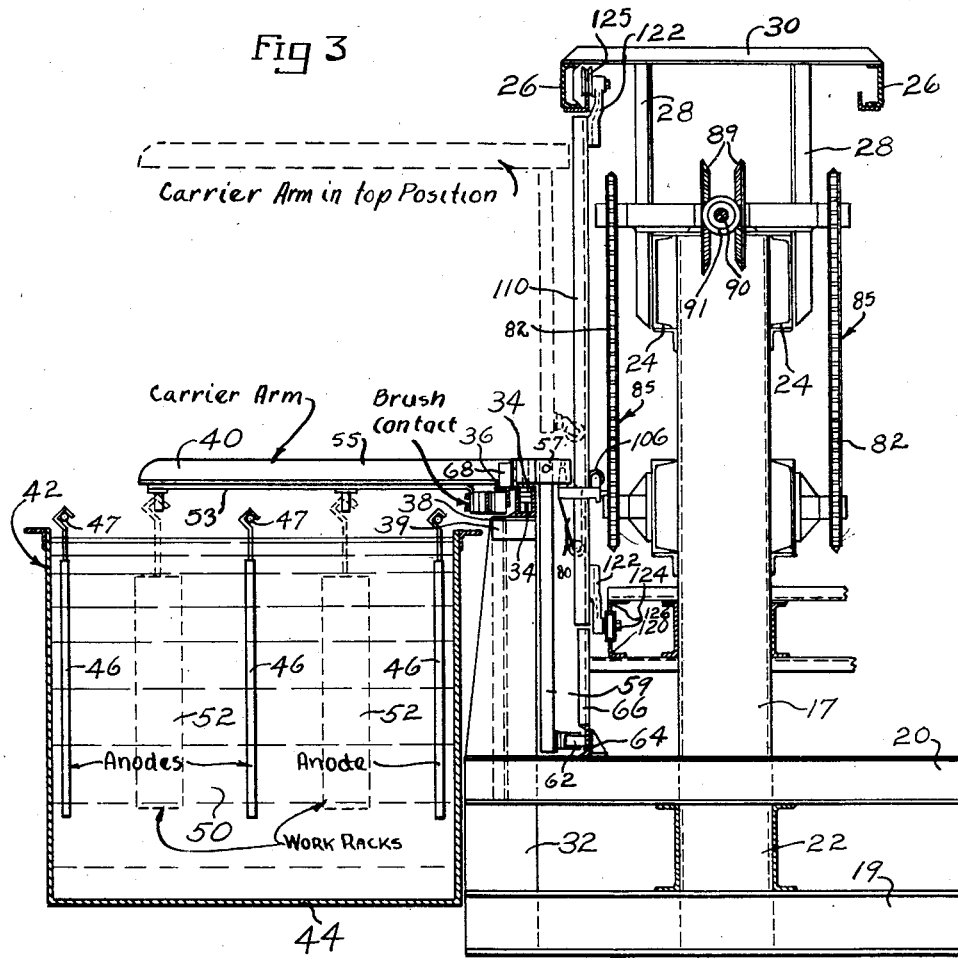

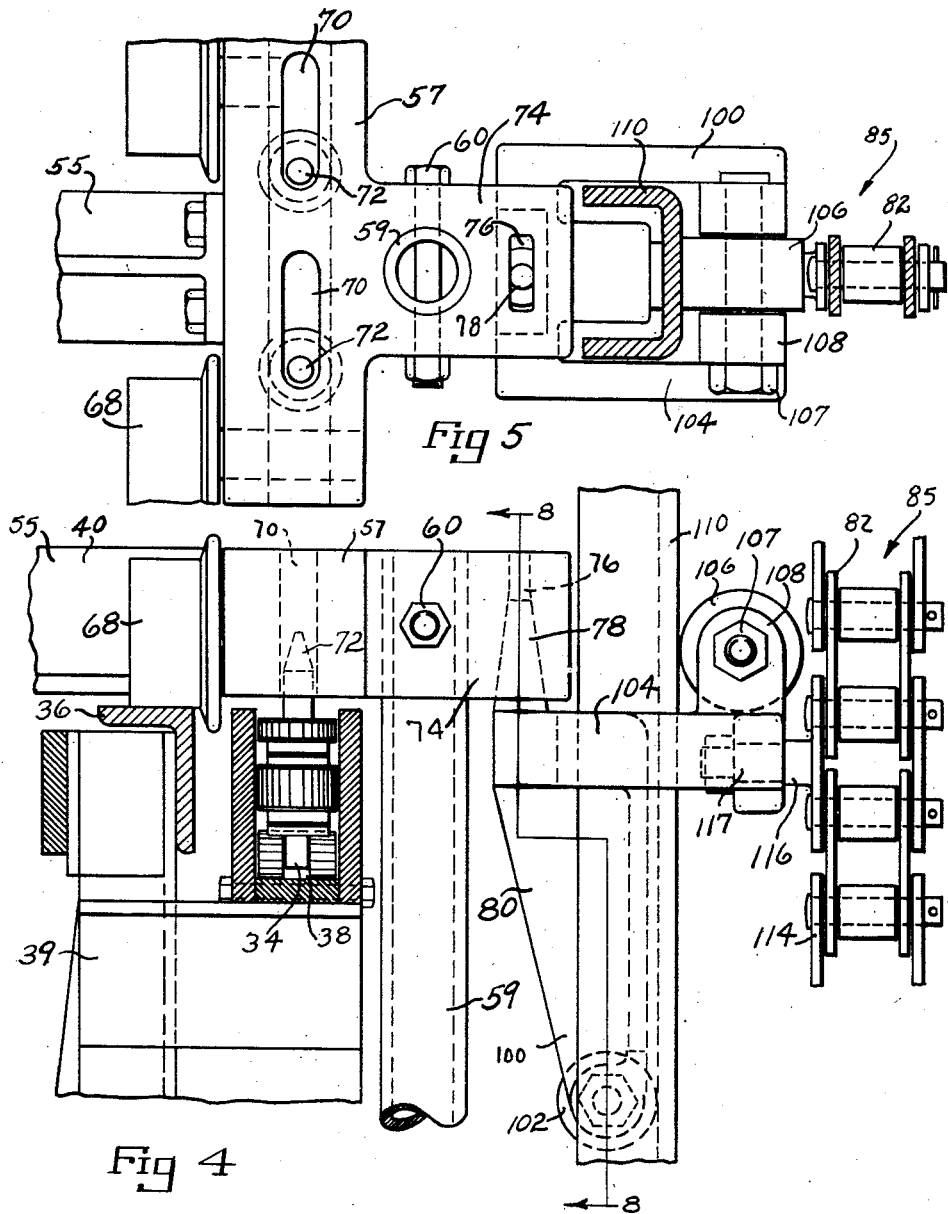

Oct. 20, 1942.  V. FINSTON  2,299,618

AUTOMATIC CONVEYING AND ELEVATING MACHINE

Filed Aug. 24, 1940  7 Sheets-Sheet 5

INVENTOR
VICTOR FINSTON
BY
ATTORNEYS

Oct. 20, 1942.  V. FINSTON  2,299,618
AUTOMATIC CONVEYING AND ELEVATING MACHINE
Filed Aug. 24, 1940    7 Sheets-Sheet 6
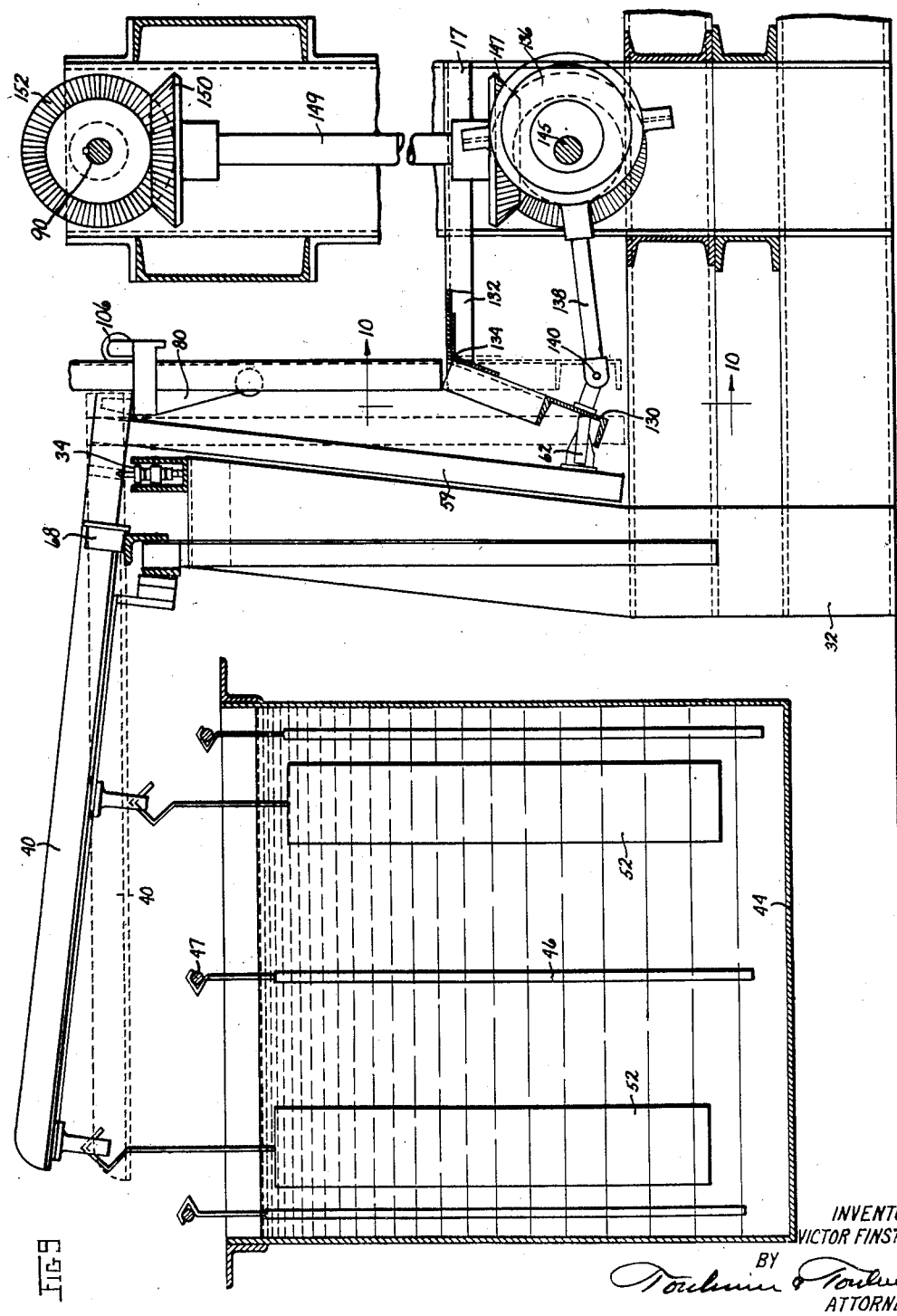
INVENTOR
VICTOR FINSTON
BY
Toulmin & Toulmin,
ATTORNEYS Oct. 20, 1942.  V. FINSTON  2,299,618
AUTOMATIC CONVEYING AND ELEVATING MACHINE
Filed Aug. 24, 1940  7 Sheets-Sheet 7
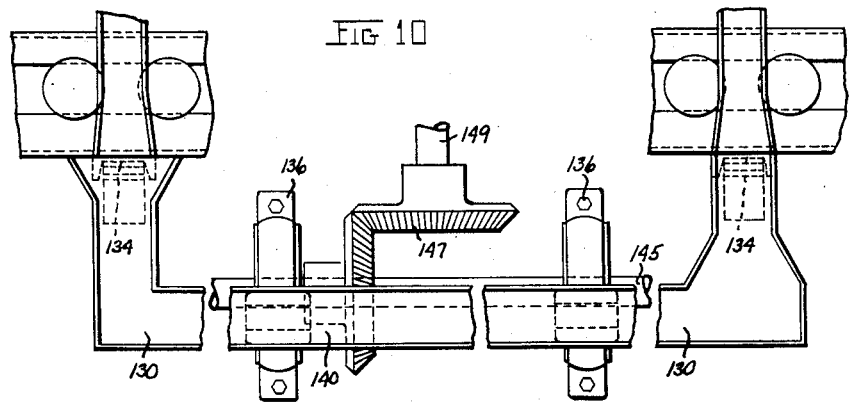
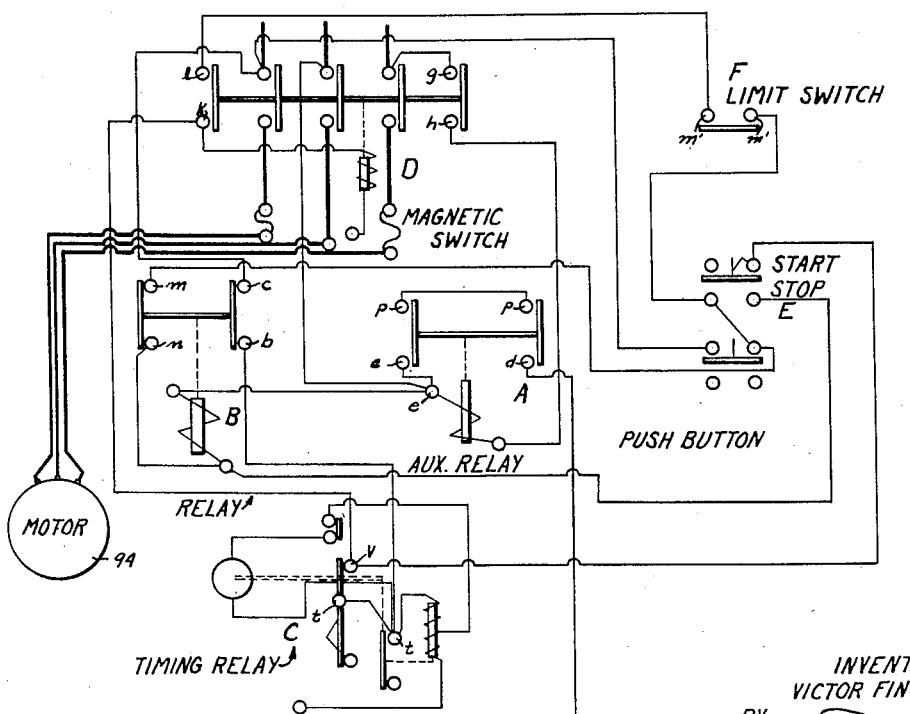
INVENTOR
VICTOR FINSTON
BY
ATTORNEYS Patented Oct. 20, 1942

2,299,618

UNITED STATES PATENT OFFICE 2,299,618

AUTOMATIC CONVEYING AND ELEVATING MACHINE

Victor Finston, Chicago, Ill., assignor to The Meaker Company, Chicago, Ill., a corporation of Illinois Application August 24, 1940, Serial No. 354,100

14 Claims. (Cl. 214—17)

This invention relates to conveying and elevating mechanism for transporting work pieces through a plurality of tanks or compartments in order to subject the material to different treatments.

The invention is particularly adapted for use in electroplating processes wherein the work, or article being treated, is carried along through a series of tanks containing cleaning, washing, plating, or other solutions, and wherein the work is automatically transferred from one tank to another by raising and lowering of the work arms carrying the parts as the arms are conveyed along over the tanks.

The conveying and transfer mechanism is illustrated and described as embodied in an electroplating machine, wherein the operations are performed continuously and automatically. The invention, however, is not limited to this particular use.

One object of this invention is to provide a novel conveyor and elevating mechanism for return-type electroplating machines which can be installed where the ceiling height is too low to accommodate the present type automatic electroplating machines.

Another object is to provide a continuous automatic conveyor mechanism comprising an improved transfer means for transferring the work from one tank to the next, drivingly associated with a main conveying mechanism, wherein each transfer comprises a work-arm supporting guide channel which is adapted to move horizontally to and fro across the front of the transfer while held in a vertical position on upper and lower trackway.

Another object is to provide an electroprocessing machine of the traveling conveyor chain type wherein the work is moved in an orbital path and transferred from one tank to another by a synchronously driven auxiliary transfer pick-up elevating and conveying means comprising a horizontally reciprocable transfer guide channel which is propelled by a pick-up pin yoke means slidable on the guide channel and pivotally mounted to one of the links on the endless chain transfer means.

Another object is to provide an improved automatic return-type plating machine of simplified construction having a main conveyor means for moving the work carrier arms horizontally in an orbital path carrying spaced horizontally extending work piece carrier arms movable over a plurality of tanks arranged around the sides of the conveyor with auxiliary cooperating transfer mechanism for transferring the work from one tank to the succeeding one, which machine can be assembled and shipped as a unit or in assembled sections ready to be bolted together at the place of installation minimizing the field erection cost.

Another object is to provide an automatic conveying machine for moving articles through several tanks containing solutions for treatment, which mechanism comprises a main conveyor chain and auxiliary elevating transfer means which is timed to synchronize with the main conveyor and arranged whereby the machine can be operated intermittently or continuously as desired.

Still another object is to provide a machine of the character described wherein the spacings of the work carrier arms are governed by the clearance between the racks along the straight-away path of the main conveyor rather than by the clearance between the racks when passing around the ends of the machine.

Another object is to provide an electro-processing machine of the traveling conveyor type having auxiliary transfer means for elevating and conveying the work pieces from one tank to the next and wherein the main conveyor and transfer mechanism is operated intermittently and simultaneously through electrical control switch mechanism.

Another object is to provide an automatic conveying machine of the character described wherein novel mechanism is provided for agitating the work piece supporting racks during the process of plating.

Another object is to provide an automatic conveying machine for transporting work pieces through a plurality of processing compartments wherein adjustable electrical control mechanism is provided for intermittently operating the machine through a cycle comprising a rest period which can be varied to produce the desired result.

Another object is to provide an improved electroprocessing machine comprising an automatic conveyor mechanism for transporting work pieces through successive processing solutions, which mechanism is driven by a motor intermittently, and wherein the operating cycle is continued with the running time of the motor determined by the position of each carrier and an idle or rest period determined by the setting of a time relay switch control mechanism.

These and other objects will be apparent from the following description taken in connection with the drawings, wherein, Figure 1 is a top plan view of a side arm plating machine embodying this invention, showing the general arrangement of the tanks and associated conveyor mechanism;

Figure 2 is a side elevation view of the machine illustrated in Figure 1 with certain parts broken away and showing the structural arrangement and mechanism for driving the horizontal conveyor chain and transfer means;

Figure 3 is an end elevation view, partly in section, with portions broken away and showing the mechanism for raising and lowering the side arm work piece carriers;

Figure 4 is a fragmentary detail view of the pusher pins and associated mechanism of the transfer means for pushing the work piece carrier arms off the main horizontal conveyor chain during transfer of the work pieces from one tank to another;

Figure 5 is a plan view of the mechanism shown in Figure 4, certain parts being shown in cross section;

Figure 9 is an elevation view, partly in section, illustrating a modification having mechanism for agitating the racks during the process of plating;

Figure 10 is a fragmentary detail elevation view taken substantially on line 10—10 of Figure 9 and looking in the direction of the arrows;

Figure 11 is a diagrammatic sketch illustrating an electrical control switch mechanism for intermittently starting and stopping the machine.

General arrangement

Figure 1:
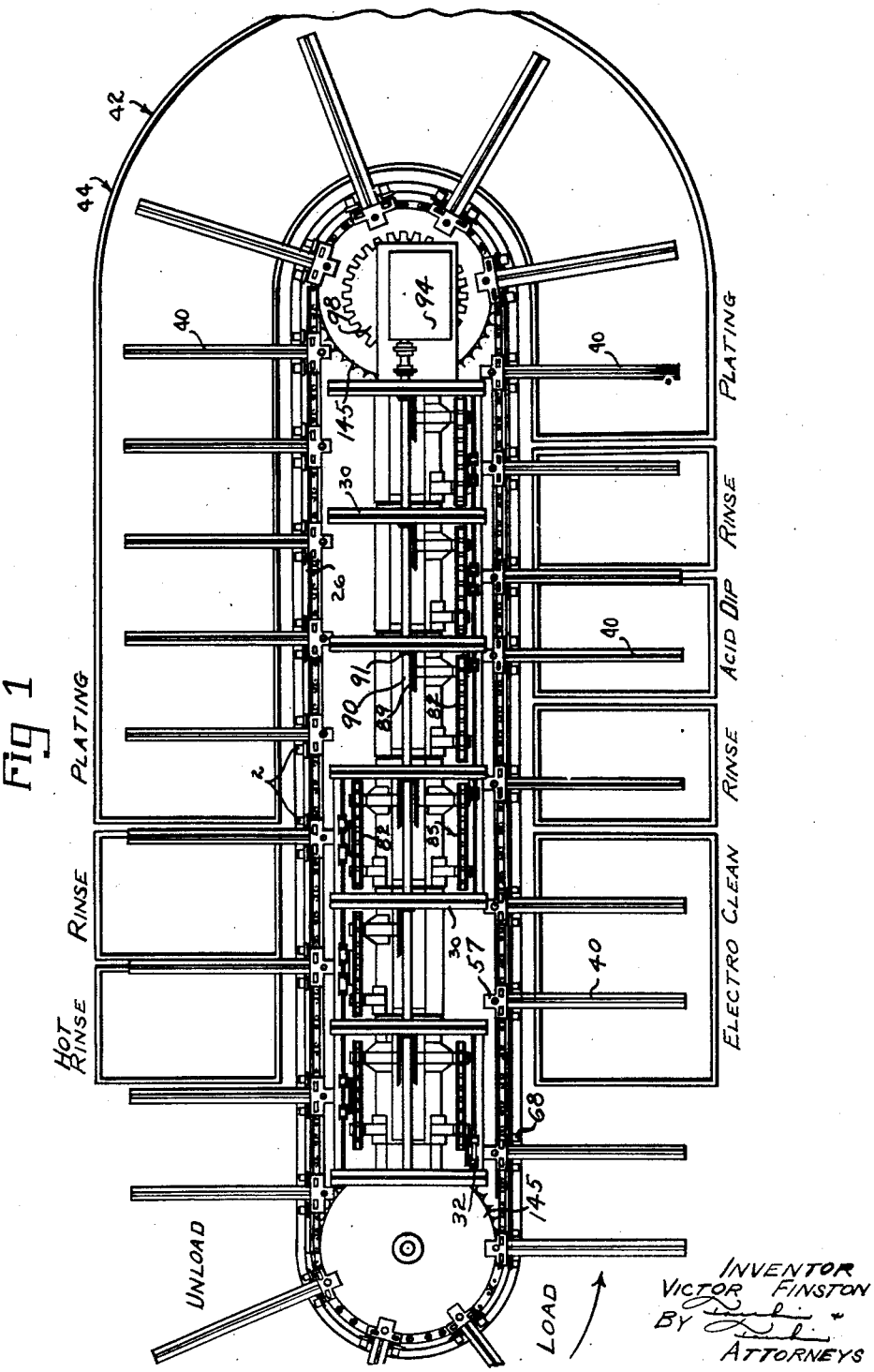

In general, the mechanism of this invention is illustrated as embodied in an automatic plating machine of the side arm type. In the arrangement shown, a plurality of tanks are arranged in an elliptical path around the central mechanism provided for conveying the work pieces through the different tanks and transferring them from one tank to another. As shown in Figure 1, the tanks containing the different treating solutions are arranged at opposite sides of the central conveyor and comprise an initial treating solution for electrocleaning the parts. Following the electrocleaning tank are arranged in succession tanks containing a rinse, acid dip, rinse and the electroplating tank containing the desired plating solution. The plating tank preferably extends around the end and along the opposite side of the conveyor mechanism, following which is arranged a cold and hot rinse tank for treating the plated parts.

A main horizontal conveyor chain carrying side arm extended work piece carrier members spaced therealong is provided for moving the work pieces in a horizontal orbital path through and over the tanks. Auxiliary transfer pick-up chain mechanism is arranged adjacent the ends of the different tanks for engaging the work piece carrier arms and moving them off the horizontal conveyor chain and transferring the work pieces from the end of one tank into the adjacent end of the next tank. The main horizontal conveyor chain and transfer-pick-up chains are preferably driven synchronously and a single motor-driving unit is utilized for this purpose. The conveyor and transfer mechanism may be driven continuously or intermittently, as desired. Suitable means may be utilized for providing intermittent operation of the main conveyor while the transfer mechanism is running continuously. Preferably, however, the main conveyor and transfers are started and stopped simultaneously. This can be accomplished by drivingly connecting intermittent motion mechanical means to the prime mover 84 and arranging it so that transfer drive shaft 90 and main conveyor drive shaft 96 can be started and stopped intermittently simultaneously. It is preferable to use electrical control means for this purpose actuated by a limit switch. Such an electrical control system is illustrated in Figure 11 and is described hereinafter. In some cases, it will be necessary to use one or more reduction units between the drive for operating the main conveyor and the transfer mechanism.

Conveying mechanism and associated structure

Referring to the drawings in detail, the conveying and transfer mechanism is illustrated in connection with a side arm automatic plating machine. This machine comprises a central framework structure having a plurality of longitudinally spaced columns 17 which are suitably fastened at their lower part to the vertically spaced cross frame members 19 and 20 and lengthwise extending channel members 22 arranged at opposite sides of the columns and secured between the cross members 19 and 20. This provides a sturdy vibration-resistant framework for supporting the conveyor and transfer mechanism.

Suitably mounted on the channel members 24, which are attached at opposite sides of the upper portion of the columns 17, is the framework for the overhead track 26 which extends in an orbital path around the sides of the conveyor mechanism. The framework supporting the track 26 comprises the uprights 28 and overhead cross members 30, as shown in Figure 3.

Spaced upstanding frame members 32 are suitably fastened to the outer ends of members 19 and 20 forming a support for the main conveyor chain means 34 and upper side arm carrier track means 36. The main conveyor chain 34 is arranged to move horizontally along in the guide channel member 38 carried by the brackets 39 mounted on the spaced upright members 32.

A plurality of work piece carrier arm members 40 are spaced along the main conveyor chain means 34, as shown in Figure 1. These work piece carrier arms are arranged to extend over the tanks, generally designated 42. As illustrated in Figure 3, the plating tank 44 comprises anode members 46 which are suspended on suitable supporting means 47 and immersed in the plating solution 50 contained in the tank. The carrier arm 40 extends over the sides of the tank and supports the work piece racks 52 by suitable means, as shown in Figure 3.

For conducting electric current to the work pieces, there is provided an electrical conducting bar 53, such as copper, to which the work piece racks 52 are connected. The work racks are suspended from the bottom of the carrier arm by brackets or other suitable means mounted on the copper bar 53 and bolted to the carrier arm. Current is carried by this copper bar and is transmitted by means of a brush contact to a cathode bar arranged along the upper end of the members 32 adjacent the plating tank as illustrated in Figure 3.

The side arm carrier members 40, as shown in Figures 4 and 5, comprise a horizontal arm member 55 from which the work piece racks are suspended. This horizontal arm is suitably secured to a T-shaped truck or carrier shoe means 57. Rigidly secured thereto is a vertically disposed depending arm member 59 as at 60. Adjacent the lower end of the depending arm member 59 is mounted a swivel caster 62 which is adapted to contact the channel guideway 64 and move horizontally therealong when the carrier arm is being conveyed along by the main chain 34. Provision is made for vertical movement of the carrier arm 40 and rear supporting portion 59 by the vertically extended channel guideways 66, as shown in Figure 2. When the carrier arm is moved vertically the swivel caster 62 rotates through 90 degrees so as to permit the carrier arm 40 and depending member 59 to be moved as a unit vertically while the caster 62 travels upward over the vertically disposed guideway portion 66.

The side arm carrier shoe 57 is supported on track 36 by means of the two flanged wheels or rollers 68, as illustrated in Figure 5. These rollers take the vertical load due to the weight of the work racks and the swivel caster 62 mounted at the bottom of the vertical carrier arm portion 59 takes the horizontal force component of this load. Elongated spaced slots 70 are provided in the carrier shoe 57 which are adapted to be engaged by the pusher pins 72 on the main carrier chain 34, whereby the carrier arms and attached work pieces are propelled along the horizontally extending track 36. The horizontal portion 55 of the carrier arm is prevented from swaying sideways during its travel on the carrier track 36 by the flanges on the two rollers 68 and by the two conveyor chain pins 72. An integral end portion 74 on the carrier shoe 57 adjacent the carrier arm supporting member 59 is provided with a tapered rectangular opening 76 for receiving a similarly tapered pick-up pin means 78 on the traveling yoke member 80 carried by the elevating and transfer mechanism. By this means the carrier arm members are engaged and moved off of the main conveyor chain pusher pins 72 when the work pieces are to be transferred from one tank to another.

*Transfer mechanism*

In order to transfer the work pieces from the end of one tank into the forward end of the next tank there is provided an auxiliary conveyor mechanism, generally designated 85. This mechanism comprises an endless chain means 82 which is arranged to be driven vertically in a rectangular shaped orbit over the spaced sprocket members 87, as illustrated in Figures 2 and 3. The uppermost sprockets 87 are driven by means of the bevel gears 89, central longitudinally extending shaft 90 and pinion gear 91. Shaft 90 is rotated by a suitably arranged motor drive unit 94 which unit also operates the main conveyor chain through the shaft 96 and gearing 98, as shown in Figure 2. The main conveyor chain and elevating transfer chains are preferably driven synchronously and timed so that the work piece carrier arms will be moved in position to be picked up off the main conveyor chain by the pins 78 on the yokes 80 at the proper time.

The pick-up pin means 80 comprises a yoke body portion 100 on the lower end of which is mounted a roller 102. The upper end comprises a U-shaped head member 104 having a roller 106 mounted for rotation on the member 107 secured in the open end inwardly extending lug portions 108 of the U-shaped head member 104. On the opposite end of the U-shaped member 104 is positioned the pick-up pin means 78 for engaging the carrier shoe opening 76. The roller 106 of the carrier pick-up pin means 80 is arranged to engage the rear side of the U-shaped guide channel member 110, whereas the roller 102 at the lower end is adapted to engage the inner side of the channel 110, as shown in Figure 5, to guide the member 80 as it travels up and down the transfer guide channel 110 and take the horizontal stresses imposed on the member 80 when it is lifting a carrier arm. Due to the cantilever suspension of the load on the carrier there is a horizontal pull exerted on the pick-up member 80 as it is being transferred. This force is taken up by the two rollers 102 and 106 and is transmitted to the transfer guide channel.

Figure 7:
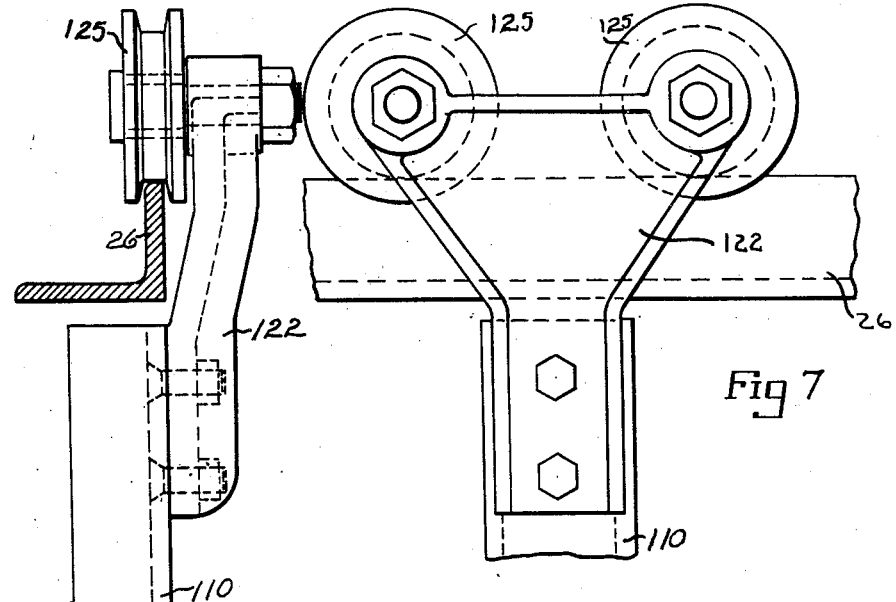
Figure 7 is a fragmentary side elevation view of the upper track roller means for supporting the transfer guide channel.
Figure 6:
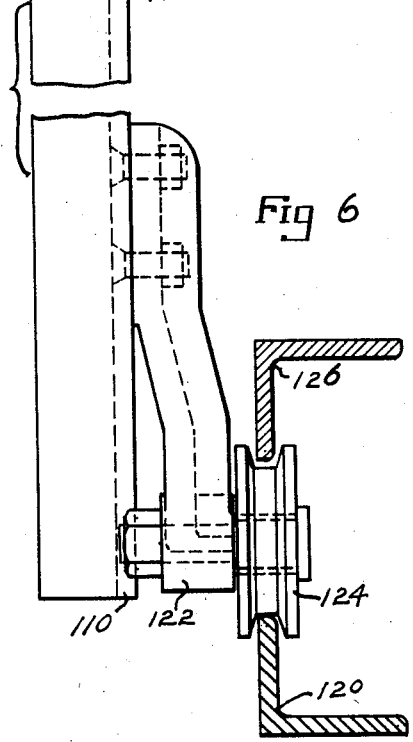
Figure 6 is an end elevation view of the transfer guide channel and track mechanism therefor.
Figure 8:
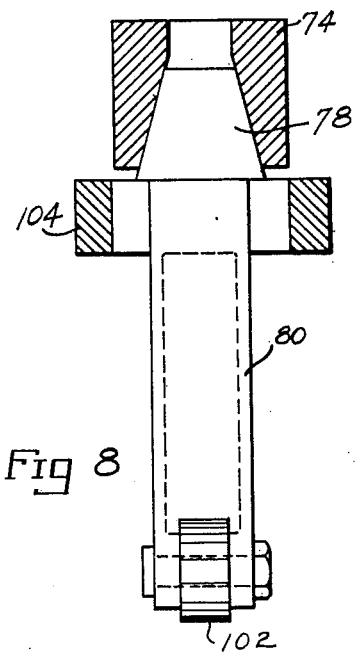
Figure 8 is a sectional view of the pusher pin means taken on the line 8—8 of Figure 4 and looking in the direction of the arrows.

The pick-up pin means 80 is pivotally fastened to the transfer sprocket driven chain means 114 by means of the bracket 116 which is bolted or otherwise secured to the U-shaped head portion 104, as shown at 117 in Figure 4. By this arrangement, the yokes 80, during operation, reciprocate vertically on the transfer guide channel 110 and are moved horizontally as the endless chain member 114 passes over the uppermost sprockets 87. In order to guide the movement of the transfer guide channel 110 horizontally there is provided a trackway 120 at the lowermost portion of the transfer guide channel, which cooperates with the upper track 26, as shown in Figures 3 and 6. The transfer guide channel 110 is suitably mounted at its ends on the upper and lower trackway means 26 and 120 respectively by bracket means 122 which are equipped with double-flanged wheels 124 and 125, as shown in Figures 3, 6 and 7. Vertical movement of the wheel 124 off the track 120 is prevented by the guide channel flange means 126 arranged parallel and opposed to the channel trackway 120, as illustrated in Figure 3.

It will be appreciated that similar transfer mechanism is arranged on both sides of the conveyor means adjacent the end walls of the tanks.

In the modification of the machine, as shown in Figures 9 and 10, mechanism is provided for rocking the carrier arm so as to agitate the racks on which the work pieces are supported while work is being plated. The use of means for agitating the work in the plating solution is required for certain kinds of plating. However, it is not necessary to agitate the work pieces in the cleaning or rinse tanks. As shown in Figure 9, the mechanism comprises a modification of the structure shown in Figure 3, wherein a lower track portion 130 on which the carrier caster 62 rolls is hinged to the end of the member 132, as at 134, whereby it can be swung back and forth, as shown by the dotted lines in Figure 9. The supporting member 132 is suitably secured to the center columns 17.

To effect the rocking or swinging of the track portion 130 there is provided an adjustable throw eccentric member 136 which comprises a rocker arm 138 pivotally attached, as at 140, to the back of the trackway 130, as shown in Figure 9. Any number of eccentrics may be used on one track depending upon the length of the plating tank. In Figure 10 two eccentrics are shown for rocking the trackway portion. The adjustment of the eccentric controls the amplitude of the swinging movement given to the trackway 130 and by this means, the amount of agitation of the work pieces 52 may be varied as desired. The eccentric means 136 is mounted for operation on the shaft 145 and suitably driven by the bevel gear means 147 which, in turn, is actuated by the shaft 149 and bevel gear 150 operated by the prime mover 94 which is drivingly connected to the shaft 90 on which is keyed the bevel gear 152 which meshes with the bevel gear means 150.

The carrier is arranged to rock on the upper track 36 while supported thereon by the rollers 68. It will be understood that the agitating mechanism, illustrated in Figure 9, may be provided for each of the different plating tanks and/or other solution processing tanks throughout the machine where agitation of the work pieces while they are being treated is desired. Further, all of the plating tanks may be located on one side of the machine or on opposite sides of the machine with the agitating mechanism installed adjacent each tank. Where plating tanks are located on opposite sides of the conveyor, the same type of rocking mechanism can be utilized with the eccentric mounted on a common shaft. The eccentric shaft can be suitably driven from the transfer line shaft or drive shaft through bevel gearing, as shown in Figures 9 and 10, or through vertical chain drive means between the two shafts, similarly as the auxiliary transfer mechanism 85 illustrated in Figure 3.

For intermittently starting and stopping the machine, the electrical control mechanism illustrated in Figure 11 is preferably utilized. This electrical control mechanism operates as follows:

Pressing the "start" button will energize auxiliary relay B, which is held in through its own interlock, circuit $n$—$m$. At the same time, the magnetic switch D is energized and closed and forms its own holding circuit through the limit switch circuit $k$—$l$—$m'$. When the magnetic switch D closes, its normally open interlock $g$—$h$ energizes the auxiliary relay A, which opens its contact. This is the normal position of the control mechanism during the time that the motor 94 is operating.

A limit switch F, placed in a suitable position on the conveyor and actuated by each carrier as it passes this limit switch, controls the operation to provide the desired stopping and starting cycle. When the carrier makes contact with the limit switch, the switch contacts are momentarily opened, interrupting the holding circuit of the magnetic switch D, which drops out instantly. When the carrier passes beyond the operating arm of the limit switch, the contacts are reclosed, re-establishing the circuit $m'$—$m'$.

When the magnetic switch D is opened, it de-energizes the coil of auxiliary relay A, which in turn closes its contacts and energizes the timing relay C, circuit $e$—$p$—$d$. The other circuit of the timer is completed through relay B, circuit $b$—$c$. As soon as it becomes energized, the timing relay C starts its timing cycle, which may be adjustable within a wide range of time in seconds. At the end of the predetermined timing cycle, timer C closes its normally open contact and energizes the coil of magnetic switch D, circuit $t$—$v$. As switch D picks up it completes its holding circuit $k$—$l$—$m'$ to hold itself in, and energizes relay A through interlock $g$—$h$, which in turn de-energizes the timing relay C. The motor is restarted when switch D closes, and continues to run until the next carrier engages the limit switch.

This operating cycle will continue with the running time of the motor determined by the position of each carrier and the idle or rest period controlled by the setting of the timing relay C.

Pressing the "stop" button will instantly de-energize the complete control mechanism, and the automatic operation will not be resumed until the "start" button is again pressed. The control mechanism provides undervoltage protection, and upon failure of voltage, the electrical control mechanism becomes de-energized and will not resume its cycle until the "start" button is again pressed. The necessary relays and switches for the electrical control mechanism described are of the conventional type and can be purchased on the market. The parts are assembled on a panel and placed in a suitable cabinet.

*Operation*

In the operation of the machine, it will be assumed that work pieces are loaded onto the spaced side arm carriers at one end of the machine, as shown in Figure 1, and the machine started so as to move the carrier arms from left to right, as shown by the arrows. As the work piece carrier arms approach the end wall of the tank it is engaged by pin means 78 on the member 80 and lifted off of the main conveyor chain and moved vertically along the transfer guide channel 110, as illustrated in Figure 3. The lower guide channel portion 66 is in line with the movable guide channel member 110 so that the caster 62 attached to the lower end of the carrier arm part 59 is guided from the channelway 64 and fixed channel portion 66 onto the movable channel 110 during the vertical movement of the carrier arm. When the carrier arm reaches the position shown in the dotted line in Figure 3 the transfer chain 114 travels horizontally across the upper sprockets carrying the pick-up pin member 80, attached carrier arm shoe 57 and carrier arm supporting channel member 110 as a unit along horizontally to a new position. When the guide channel 110 and associated carrier arm member are moved to the right the channel is brought in line with the next guide channel portion spaced adjacent the front end of the next tank, as shown in Figure 2, and the carrier arm is again lowered onto the main conveyor chain means.

In this manner, the lower portion of the carrier arm supported by the caster 62 is guided onto the lower horizontal channelway 64 and the carrier arm positioned on the main horizontal conveyor chain pins 72. The member 80 and pick-up pin 78 continue to move downward while the carrier remains momentarily at rest whereby the pin 78 is disengaged from the carrier shoe 57. Thereafter, the carrier arms and work piece racks supported thereon are moved through the solution in the tank until another end wall is approached whereupon similar transfer mechanism is provided to remove the work pieces and place them in the next succeeding tank and continue the cycle of treatment.

The main conveyor chain pusher pins 72 do not interfere with the end wall portions of the slots 79 in the carrier arm shoe member 57 because the speed of the transfer chain 114 is timed so that the carrier arm shoe 57 is lifted off the pins 72 quickly enough to prevent any interference. In setting down the carrier shoe onto the main conveyor chain, when the transfer of the work pieces into the next tank has been completed, the carrier shoe 57 is set about an inch ahead of the pusher pins 72 so that the pins come approximately in the center of the slots 70. The carrier arm shoe then remains at rest until the main conveyor pusher pins 72 have traveled forward and engaged the end walls of the slots 70 so as to push the carrier arm shoe along.

For providing intermittent operation of the machine utilizing the electrical control system illustrated in Figure 11, the limit switch F is suitably positioned adjacent the main conveyor chain 34 and arranged so that the operating arm of the limit switch is engaged by each carrier as it passes along stopping the whole machine for a predetermined time determined by the setting of the timing relay C.

If desired, the transfer mechanism may be counterbalanced by a suitable spring or weight means. However, in the usual installation one or more transfer or pick-up carrier means are in operation while one or more carriers are being lowered so that the conveyor mechanism is sufficiently balanced without the use of special means for this purpose. It will be understood that the number of transfer mechanisms will vary according to the length of the machine and the number of tanks. In each case, however, the transfer mechanism will be arranged to pick up the carrier arms supporting the work pieces at the proper time independently of the position of the other carrier arms on any of the other transfers.

The work piece transfer lifting means 80, as illustrated in Figures 1 and 2, at any particular instant may be located at different places on the transfer guide mechanism. For instance, on some transfers the carrier means may be going up while on others they are coming down. The relative position of the lifting means will, of course, depend on the distance between the transfers, which, in turn, requires that the timing mechanism be set so that the work pieces will be picked up and set down at the proper time as they are moved along. When properly timed the lifting means will be in position to engage a work carrier arm when it reaches the end of a tank and transfer it to the next succeeding tank. The limit switch F can be located in any suitable place on the machine in position where each carrier arm will engage it and stop the machine for a predetermined time, after which it will be started again automatically by the timing mechanism and this cycle is repeated when the next carrier engages the limit switch.

It will be understood that the conveyor and transfer mechanism illustrated in connection with an automatic electroplating machine is susceptible of various forms and modifications and is applicable for other processing treatments where articles are to be conveyed from one position to another, and it is to be understood that this invention is not limited to the exact details of the construction shown except as defined by the appended claims.

Having thus fully described my invention, what I claim as new and desire to secure by Letters Patent is:

1. A conveying and transfer mechanism comprising a main conveyor arranged to move horizontally around an orbital path, said main conveyor being adapted to have work piece carrier arm means positioned for movement thereby in said orbital path, and means associated with said conveyor for elevating said work piece carrier arm means off of said conveyor and moving it along horizontally independently of said main conveyor, said carrier arm elevating means comprising a vertically arranged horizontally shiftable member for guiding the vertical movement of said work piece carrier, means horizontally disposed for guiding said shiftable member at each of its ends as it is shifted horizontally by said elevating means, said transfer means being adapted to return said work piece carrier arm means onto said conveyor so as to transfer the work pieces to an advanced position along said orbital path.

2. A conveying and transfer mechanism comprising an endless horizontal conveyor, work piece carrier arm means adapted to be moved along by said conveyor, elevating means associated with said conveyor comprising an endless moving member having means attached to said member for engaging said work piece carrier arm means and moving the same vertically and horizontally independently of said horizontal conveyor so as to return said work piece arms to said horizontal conveyor at an advanced point along the path of said conveyor, said elevating means also comprising a horizontally shiftable means which is adapted for vertically guiding said work piece carrier arm means during its movement while elevated off of said horizontal conveyor.

3. A conveying and transfer mechanism comprising a horizontal conveyor chain movable in an orbital path, said conveyor chain having work piece carrier arm means independently supported adjacent said horizontal conveyor chain and adapted to be moved horizontally thereby, means attached to said carrier arm comprising a depending member providing a lever pivotally secured to said arm, means comprising trackways for guiding said work piece carrier arm during its horizontal movement, means for moving said work piece carrier arm vertically while maintaining said work piece carrier arm and attached means in the same relative position with respect to said horizontal conveyor chain, means comprising a vertical guide channel along which said carrier means is adapted to be guided during its vertical movement, and common prime mover means for moving said horizontal conveyor and said work piece carrier arm vertically moving means.

4. A conveying and transfer mechanism comprising a conveyor means adapted to move in an orbital path, work piece carrier arms mounted for movement by said conveyor means, means comprising spaced pins for engaging a portion of said work piece carrier arm and moving the same along with said horizontal conveyor means, means comprising a horizontally movable upright guide channel along which said work piece carrier arm is adapted to be guided for vertical movement, and means for moving said work piece carrier arm on said guide channel and moving said carrier arm and guide channel as a unit horizontally.

5. A conveying and transfer mechanism comprising a horizontal conveyor chain movable in an orbital path, means comprising tanks associated adjacent said horizontal conveyor chain, side arm work piece carrier means mounted for movement over said tanks, means associated with said horizontal conveyor chain for contacting said work piece carrier arm and moving the same therealong, means comprising a vertically reciprocable and horizontally movable transfer mechanism operatively associated with said horizontal conveyor chain means and moving said work piece carrier arm off of said horizontal conveyor chain and guiding it vertically and horizontally to a new position with respect to said tanks, said transfer mechanism comprising an endless chain having means thereon for engaging a portion of said work piece carrier arm to lift it off of said horizontal conveyor chain, and means associated with said last mentioned means for supporting and guiding the vertical movement of said work piece carrier arm, said guiding means comprising an upright channel member adapted to be moved horizontally when said work piece carrier arm has reached the end of its vertical movement.

6. A conveying and transfer mechanism comprising a horizontal conveyor chain movable in an orbital path, means comprising tanks associated adjacent said horizontal conveyor chain, side arm work piece carrier means associated with said horizontal conveyor chain for contacting said work piece carrier arm and moving the same therealong, means comprising a vertically reciprocable and horizontally movable transfer mechanism operatively associated with said horizontal conveyor chain means and moving said work piece carrier arm off of said horizontal conveyor chain and guiding it vertically and horizontally to a new position with respect to said tanks, said transfer mechanism comprising an endless chain having means thereon for engaging a portion of said work piece carrier arm to lift it off of said horizontal conveyor chain, means associated with said last mentioned means for supporting and guiding the vertical movement of said work piece carrier arm, said guiding means comprising an upright channel member adapted to be moved horizontally when said work piece carrier arm has reached the end of its vertical movement, and common means for driving said horizontal conveyor chain and said transfer mechanism.

7. A conveying and transfer mechanism for moving work piece carrier arms over a plurality of tanks, means comprising a horizontal conveyor for moving work pieces along in an orbital path over said tanks, vertical transfer means movable in a rectangular shaped path for engaging said work piece carrier arms adjacent the end of one tank to lift said work pieces out of one tank and replace them into the next succeeding tank including means comprising a guide channel having associated therewith means adapted for supporting each of said work piece carrier arms as they are moved vertically, means comprising trackways associated with the ends of said guide channel whereby said channel means can be moved horizontally, and means for synchronously driving said horizontal conveyor and vertical transfer means.

8. A conveying machine for transporting work between a series of operating stations separated by barriers, comprising a plurality of work carrier arms, means for supporting said work carrier arms on a horizontal trackway, means associated with said trackway for moving said arms therealong in a horizontal path, and means arranged adjacent said barriers for moving said work carrier arms vertically and horizontally to carry the work over said barriers as they approach a predetermined position on one side of said barrier means, said last named means including a vertically disposed horizontally shiftable carrier arm guideway, and horizontal guides disposed above and below said horizontal trackway for guiding the horizontal movement of said guideway.

9. A conveying machine for transporting work pieces between a series of operation stations separated by barrier means comprising an L-shaped work carrier arm, means for supporting said work carrier arm on a horizontal guideway, means for guiding said work carrier arm along said guideway while being moved in a horizontal path, means for guiding said work carrier arm vertically at intervals over a vertically arranged stationary guideway portion and an aligned laterally shiftable guideway member, and means associated with said laterally shiftable guideway member for engaging said work carrier arm and moving it vertically and horizontally whereby said work carrier arm is moved from one side of said barrier to the other side.

10. In an electroprocessing machine, a frame, processing tanks disposed in series along the sides of said frame, an endless conveyor for moving work successively through said processing tanks, said conveyor comprising a horizontally disposed endless chain moving in an orbital path around said frame, work piece carrier arm means movable around said orbital path by said endless conveyor, means independent of said endless chain for supporting said work piece carrier arm means including auxiliary transfer elevating means for moving said work piece carrier arm means off said endless conveyor for transferring the work piece from one processing tank to another, said auxiliary transfer elevating means comprising a vertically disposed horizontally movable trackway, and means movable in said trackway connected to said independent means.

11. In an electroprocessing machine, a frame, processing tanks disposed in series along the sides of said frame, an endless conveyor for moving work successively through the processing tanks, said conveyor comprising a horizontally disposed endless chain moving in an orbital path around said frame, work piece carrier arm means movable around said orbital path by said endless conveyor, independent means for supporting said work piece carrier arm means, auxiliary transfer elevating means for moving said work piece carrier arm means off said endless conveyor for transferring the work piece from one processing tank to another, said auxiliary transfer elevating means comprising a vertically disposed horizontally movable trackway, and means comprising a member reciprocable on said vertically disposed trackway member, said reciprocable member being driven by a movable endless means supported by said frame.

12. In combination, a frame, horizontal conveyor means supported on said frame for moving a plurality of work piece carrier arm means therealong, auxiliary transfer means operatively associated therewith adapted to engage said work piece carrier arm means at intervals to elevate the same and move to an advanced position relative to said frame and return said work piece carrier arm onto said horizontal conveyor, means for synchronously operating said horizontal conveyor and elevating means whereby the work piece carrier arms will be elevated at predetermined positions along the horizontal path, said auxiliary transfer means comprising a vertically arranged horizontally shiftable member adapted to receive a temporary support for said carrier arm means said temporary support forming part of said transfer means.

13. In an electroplating machine, a frame, processing tanks disposed in a series along the sides of said frame, an endless conveyor for moving the work through the processing tanks, said conveyor comprising a horizontally disposed endless chain adapted to move along the sides and around the ends of said frame, means associated therewith for supporting work piece carrier arm members in position to be moved along by said horizontally disposed endless chain, said work piece carrier arms being arranged to extend over the sides of said tanks and comprising a depending arm, said depending arm having a movable member engaging a horizontal guideway as said work carrier arms are moved along in a horizontal path, means comprising a vertically disposed horizontally movable guideway supported by said frame, and means for vertically reciprocating said work carrier arms onto said vertically disposed guideway member when said work piece carrier arms approach the end of one tank to transfer the work piece from one tank to another.

14. A conveying and transfer mechanism comprising a conveyor means adapted to move in an orbital path, workpiece carrier arms mounted for movement by said conveyor means, means comprising spaced engaging means for engaging a portion of said workpiece carrier arm, and moving the same along with said horizontal conveyor means, means comprising a horizontally movable upright guiding member along which said workpiece carrier arm is adapted to be guided for vertical movement, and means for moving said workpiece carrier arm on said guiding means and moving said carrier arm and guiding means as a unit horizontally.

VICTOR FINSTON.